United States Patent
Ishikawa et al.

(10) Patent No.: US 7,194,266 B2
(45) Date of Patent: Mar. 20, 2007

(54) HANDOVER CONTROL METHOD, MOBILE STATION AND COMMUNICATION CONTROL APPARATUS

(75) Inventors: Yoshihiro Ishikawa, Yokosuka (JP); Yoshiaki Ofuji, Yokosuka (JP); Seizo Onoe, Yokohama (JP); Takehiro Nakamura, Yokosuka (JP); Mikio Iwamura, Zushi (JP); Takahiro Hayashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 363 days.

(21) Appl. No.: 10/060,248

(22) Filed: Feb. 1, 2002

(65) Prior Publication Data

US 2002/0119779 A1  Aug. 29, 2002

(30) Foreign Application Priority Data

Feb. 1, 2001   (JP)   ............................. 2001-025629

(51) Int. Cl.
  *H04Q 7/20*   (2006.01)
(52) U.S. Cl. .................. 455/442; 455/436; 455/439
(58) Field of Classification Search ............... 455/522, 455/436, 443, 439, 442; 370/347, 386
  See application file for complete search history.

(56) References Cited

U.S. PATENT DOCUMENTS

| | | | |
|---|---|---|---|
| 5,276,906 A | 1/1994 | Felix | |
| 5,682,601 A | 10/1997 | Sasuta | |
| 5,822,696 A | 10/1998 | Bergkvist | |
| 6,041,235 A | 3/2000 | Aalto | |
| 6,064,890 A | 5/2000 | Hirose et al. | |
| 6,311,065 B1 | 10/2001 | Ushiki et al. | |
| 6,711,408 B1 * | 3/2004 | Raith | 455/440 |
| 2002/0082036 A1 * | 6/2002 | Ida et al. | 455/522 |
| 2003/0016648 A1 * | 1/2003 | Lindsay et al. | 370/347 |

FOREIGN PATENT DOCUMENTS

| | | |
|---|---|---|
| EP | 1 061 752 | 12/2000 |
| JP | 08-126046 | 5/1996 |
| JP | 8-294158 | 11/1996 |
| JP | 09-219879 | 8/1997 |
| JP | 09-224275 | 8/1997 |
| JP | 10-191419 | 7/1998 |
| JP | 10-290475 | 10/1998 |
| JP | 2000-092543 | 3/2000 |
| WO | WO 97/32445 | 9/1997 |

* cited by examiner

*Primary Examiner*—Duc M. Nguyen
*Assistant Examiner*—Wayne Cai
(74) *Attorney, Agent, or Firm*—Oblon, Spivak, McClelland, Maier & Neustadt, P.C.

(57) ABSTRACT

When a handover standby threshold falls below a received power of perch channel from a base station 150-1 of a communication partner, a mobile station 110 sends a handover standby operation request to a base station control apparatus 130, and notifies of history of movement of itself and receives powers of perch channels from base stations 150-2–150-4 surrounding the communication partner (mobile station information). The base station control apparatus 130 compares the mobile station information with history of mobile station information so that a handover destination candidate base station is selected and sent to the mobile station 110. The mobile station 110 switches the communication partner to the handover destination candidate base station when received power of the perch channel from the base station 150-1 falls below a handover threshold.

10 Claims, 5 Drawing Sheets

FIG.4

| | BASE STATION OF HANDOVER DESTINATION | | | |
|---|---|---|---|---|
| | #1 | #2 | ... | #N |
| #1 | | $X_{12}$ | ...... | $X_{1N}$ |
| #2 | $X_{21}$ | | | |
| ⋮ | ⋮ | | ⋱ | ⋮ |
| #N | $X_{11}$ | | ...... | |

(Row labels: BASE STATION OF HANDOVER ORIGINATION)

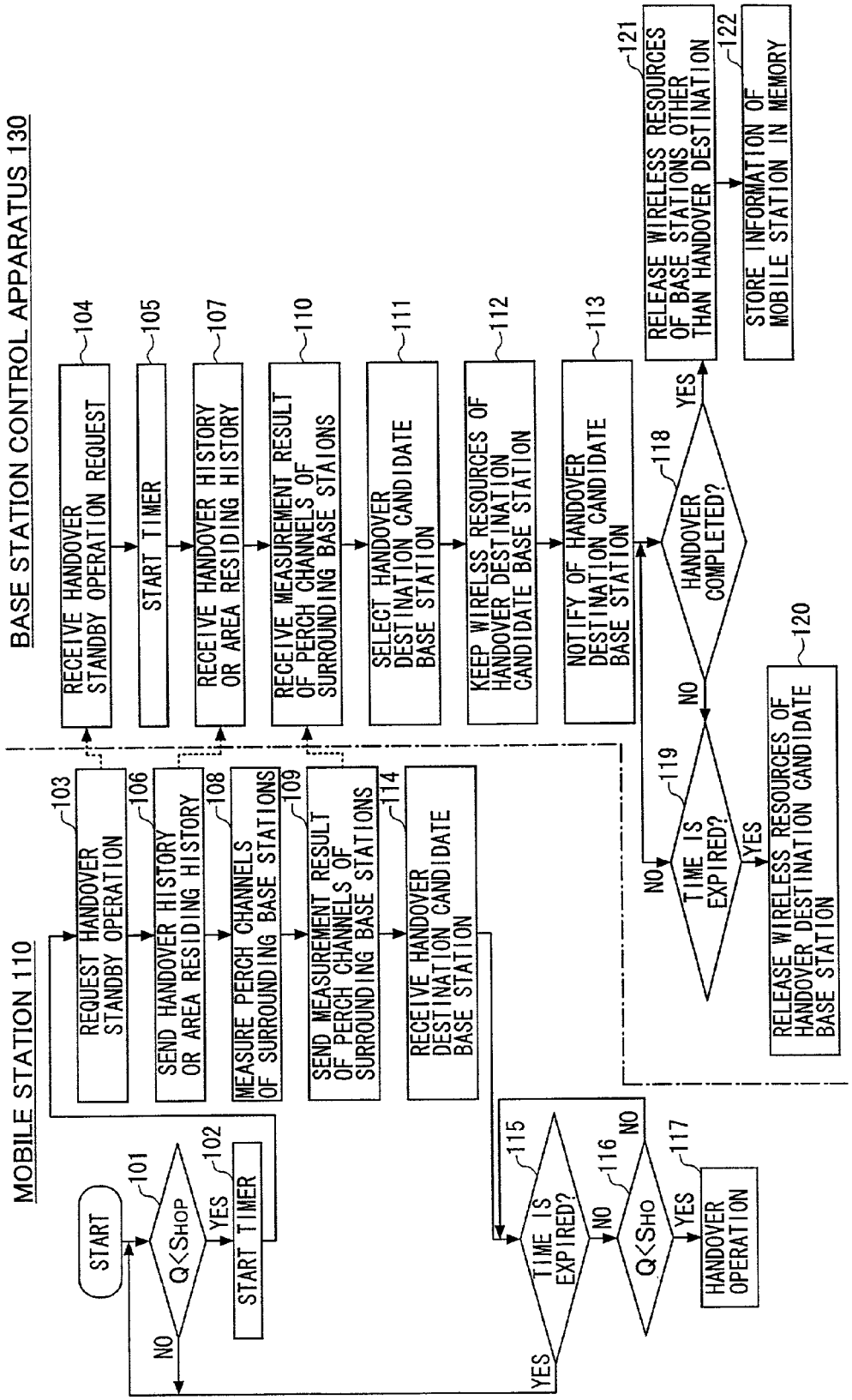

# HANDOVER CONTROL METHOD, MOBILE STATION AND COMMUNICATION CONTROL APPARATUS

BACKGROUND OF THE INVENTION

1. Field of the Invention

The present invention relates to a handover control method, a mobile station and a communication control apparatus used for the handover control method in a mobile communication system including a communication apparatus having a function of a base station, the mobile station and the communication control apparatus which controls connection of communication channels between the communication apparatus and the mobile station.

2. Description of the Related Art

In a conventional mobile communication system, the mobile station always receives perch channels from a base station which is a communication apparatus with which the mobile station communicates (base station which is a transmit/receive partner of user data, such base station will be called a communication partner) and base stations surrounding the base station of the communication partner, and measures received powers of the perch channels. Then, when a received power of a perch channel from a surrounding base station is larger than a received power of the base station of the communication partner by more than a predetermined value, the mobile station performs handover to the surrounding base station according to control by a base station control apparatus which is a communication control apparatus which controls communication channels between the mobile station and the base station. As a result, the connection destination is switched. This handover operation is called hard handover.

In a mobile communication system using code-division multiple access (CDMA), the mobile station can connect to a plurality of base stations simultaneously. Thus, being controlled by the base station control apparatus, the mobile station releases connection to a base station which is originally connected after establishing connection to a base station of a handover destination. This handover operation is called soft handover. However, the soft handover is performed in the same way as the hard handover. That is, in the soft handover, the mobile station measures received powers of perch channels sent from the base stations of the communication partner and the surrounding base stations. Then, when a received power of a perch channel from a surrounding base station is larger than a received power of the base station of the communication partner by more than a predetermined value, the mobile station performs handover to the surrounding base station controlled a base station control apparatus which is a communication control apparatus which controls communication channels between the mobile station and the base station so that the connection destination is switched However, according to the above-mentioned conventional method, handover is always performed when the received power of the perch channel from the surrounding base station is larger by more than the predetermined value, even when the received power of the perch channel from the base station of the communication partner is large enough, that is, even when handover is unnecessary. Therefore, the conventional method is not necessarily a good method from the view point of efficient use of wireless resources. In addition, there is a problem in that large load is imposed to the base station control apparatus which controls the handover and the mobile station.

In addition, according to the conventional method, the wireless resource of the base station of the handover destination is not considered at all. Therefore, when a request of handover is sent to a base station, there is a case in which the request is rejected due to lack of wireless resource so that communication is disconnected forcefully.

SUMMARY OF THE INVENTION

An object of the present invention is to provide a handover control method, a mobile station and a communication control apparatus in which unnecessary handover operation is suppressed and success rate of handover is improved.

The above object is achieved by a handover control method used in a mobile communication system which includes communication apparatuses having functions of base stations, a mobile station and a communication control apparatus which controls connections between the communication apparatuses and the mobile station, the handover control method including the steps of:

the mobile station switching a communication apparatus of a communication partner to another communication apparatus when a communication quality value between the communication apparatus of the communication partner and the mobile station falls below a first threshold which is better than a limitation value by which communication is available;

wherein the communication control apparatus selects at least a handover destination candidate communication apparatus from among communication apparatuses surrounding the communication apparatus of the communication partner when the communication quality value falls below a second threshold which is better than the first threshold; and the communication control apparatus keeps wireless resources of the at least a handover destination candidate communication apparatus which is selected.

According to the handover control method, handover operation is not performed in the mobile station even when the received power of the perch channel from the communication apparatus of the communication partner falls below a received power from a communication apparatus surrounding the communication partner as long as the received power does not reach limitation by which communication is available. Thus, according to the present invention, it does not occur that handover is performed since the received power from the surrounding base station is larger than a predetermined value even when the received power of the perch channel from the base station is large enough. Thus, unnecessary handover can be suppressed so that wireless resources can be used efficiently, and load of the mobile station and the base station control apparatus which controls handover can be decreased.

When the base station forms a cell as a communication area, the communication apparatus means the base station itself. On the other hand, when the base station forms sectors to which the cell is divided, the communication apparatus means an apparatus which includes at least a directional antenna in a plurality of directional antennas provided in the base station for forming the sectors and which communicates with the mobile station.

In addition, according to the invention, since the wireless resources of the communication apparatus of the handover destination can be kept before handover is performed, it can be avoided that the communication apparatus rejects handover so that communication is disconnected forcefully. Thus, success ratio of handover can be increased.

The handover control method may include the steps of:

the communication control apparatus notifying the mobile station of a handover destination candidate communication apparatus for which wireless resources are kept in the at least a handover destination candidate communication apparatus; and the mobile station switching the communication apparatus of the communication partner to the handover destination candidate communication apparatus which is notified by the communication control apparatus when the communication quality value falls below the first threshold.

In addition, the handover control method may include the steps of:

the mobile station judging whether the communication quality value falls below the second threshold, and sending a request for selecting the at least a handover destination candidate communication apparatus to the communication control apparatus when the communication quality value falls below the second threshold.

According to the invention, since the mobile station judges whether the communication quality value falls below the second threshold, it is not necessary for the communication control, apparatus to perform such judgment. Thus, load of the communication control apparatus can be further decreased.

The handover control method may include the steps of:

when the communication control apparatus selects a plurality of handover destination candidate communication apparatuses, the communication control apparatus determining priorities of the plurality of handover destination candidate communication apparatuses;

the communication control apparatus notifying the mobile station of handover destination candidate communication apparatuses in the plurality of handover destination candidate communication apparatuses for which wireless resources are kept and corresponding priorities;

the mobile station switching the communication apparatus of the communication partner to one of the notified handover destination candidate communication apparatuses according to the priorities.

According to the handover control method, since a plurality of handover destination candidate communication apparatuses are selected, even when a request for handover for a communication apparatus is rejected, other communication apparatus can be used for the handover destination. Thus, success ratio of handover can be further improved. In addition, by assigning priorities for the selected handover destination candidate communication apparatuses, the handover destination can be properly selected.

From the viewpoint of properly selecting the handover destination candidate communication apparatus on the basis of results of past handover and improving success ratio of handover, the handover control method may include the steps of:

the mobile station sending mobile station information to the communication control apparatus, the mobile station information including a history of movement of the mobile station and received powers of perch channels from communication apparatuses surrounding the communication apparatus of the communication partner;

the communication control apparatus having a history of mobile station information, the history of mobile station information including a history of movement of the mobile station and received powers of perch channels from communication apparatuses surrounding the communication apparatus of the communication partner for past successful handover; and the communication control apparatus selecting the at least a handover destination candidate communication apparatus according to the mobile station information sent from the mobile station and the history of mobile station information for past successful handover.

From the viewpoint of properly assigning priorities of the selected handover destination candidate communication apparatuses on the basis of results of past handover so that success ratio of handover is improved, the handover control method may include the steps of:

when the communication control apparatus selects a plurality of handover destination candidate communication apparatuses, the communication control apparatus determining priorities of the plurality of handover destination candidate communication apparatuses according to the mobile station information sent from the mobile station and the history of mobile station information for past successful handover.

In addition, the handover control method may include the steps of:

the communication control apparatus holding the history of mobile station information for all communication apparatuses controlled by the communication control apparatus.

From the viewpoint of holding the history of mobile station information at times when handover was succeeded in the past such that it becomes easy to select the handover destination communication apparatus, the handover control method may include the steps of:

the communication control apparatus holding the history of mobile station information by each combination of a communication apparatus of handover origination and a communication apparatus of handover destination.

From the viewpoint of properly selecting the handover destination candidate communication apparatus and improving success ratio of handover, the handover control method may include the steps of:

the communication control apparatus selecting a communication apparatus of handover destination corresponding to history data in the history of mobile station information in which a correlation value between the history data and the mobile station information sent from the mobile station is equal to or larger than a predetermined value.

From the viewpoint of properly assigning priorities of the selected handover destination candidate communication apparatuses on the basis of results of past handover so that success ratio of handover is improved, the handover control method may include the steps of:

when the communication control apparatus selects a plurality of handover destination candidate communication apparatuses, the communication control apparatus determining priorities of the plurality of handover destination candidate communication apparatuses according to the correlation value.

BRIEF DESCRIPTION OF THE DRAWINGS

Other objects, features and advantages of the present invention will become more apparent from the following detailed description when read in conjunction with the accompanying drawings, in which:

FIG. 4 shows an example of a history of mobile station information;

FIG. 5 is a flowchart indicating the operation of the mobile communication system.

DETAILED DESCRIPTION OF THE PREFERRED EMBODIMENTS

Figure 1:
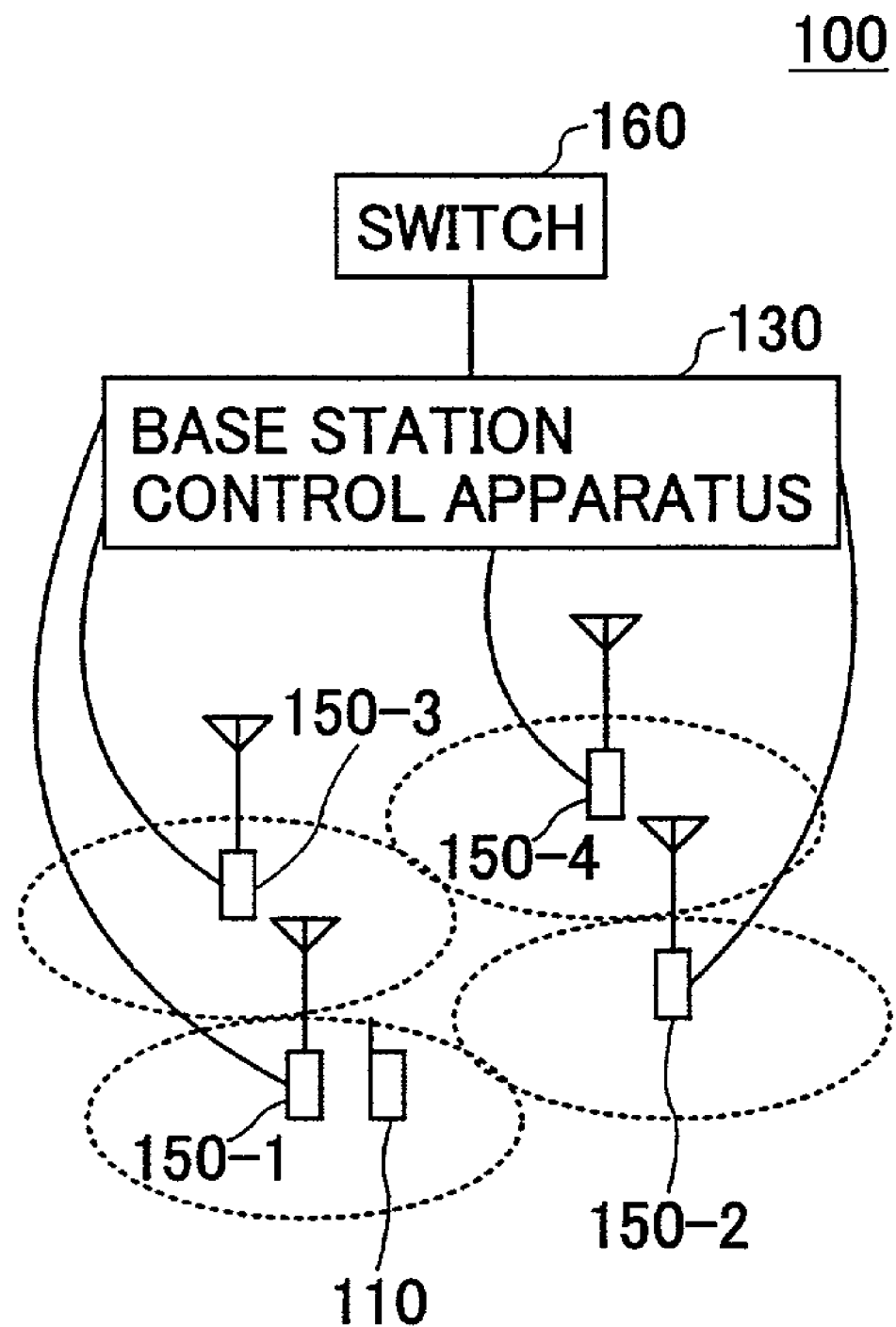
FIG. 1 shows a block diagram of a mobile communication system.

In the following, embodiments of the present invention will be described with reference to figures. FIG. 1 shows a block diagram of a mobile communication system to which the handover control method of the present invention is applied.

The mobile communication system 100 shown in the figure includes a mobile station 110, a mobile station control apparatus 130 which is a communication control apparatus, base stations 150 (150-1–150-4) each of which is a communication apparatus controlled by the base station control apparatus 130 and a switch 160.

In the mobile communication system 100, each base station forms a cell which is a communication area. The mobile station 110 is positioned in a cell formed by the base station 150-1, and transmits and receives user data such as voice data to/from the base station 150-1 of a communication partner. In addition, the mobile station receives perch channels from the base stations 150-2–150-4 surrounding the base station 150-1. The base station control apparatus 130 selects a candidate base station for a handover destination from the base stations 150-2–150-4 and reserves wireless resources of the selected base station when received power of the perch channel from the base station 150-1 falls below a threshold (handover standby threshold) which is a better value than a limitation value by which communication is available. Then, the mobile station 110 switches a communication partner to the base station selected by the base station control apparatus 130 when the received power of the perch channel from the base station 150-1 falls below a handover threshold (handover threshold<handover standby threshold) which is a better value than a limitation value by which communication is available.

Figure 2:
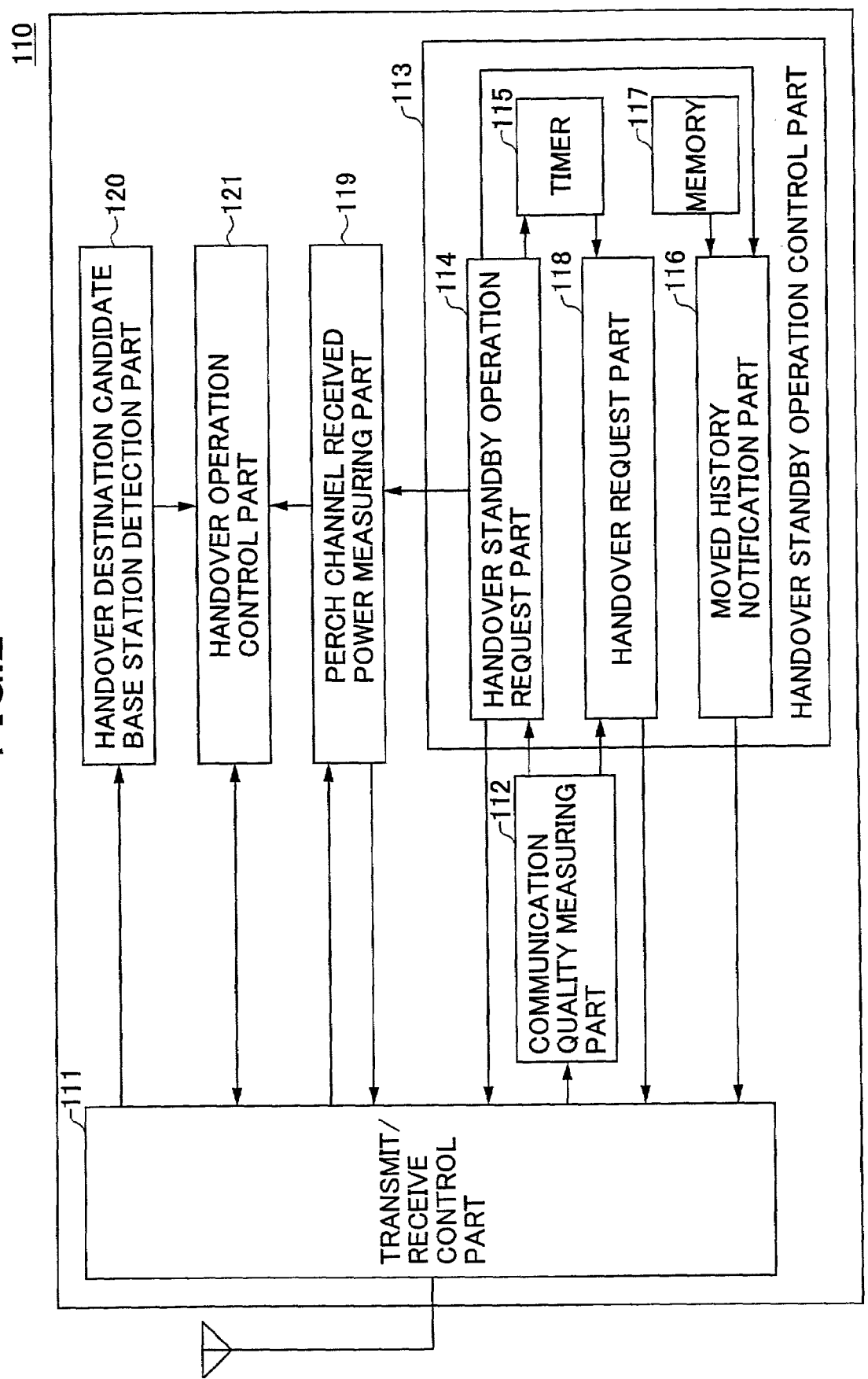
FIG. 2 shows a configuration example of a mobile station.

FIG. 2 shows a configuration example of the mobile station 110. The mobile station 110 shown in FIG. 2 includes a transmit/receive control part 111, a communication quality measuring part 112, a handover standby operation control part 113, a perch channel received power measuring part 119, a handover destination candidate base station detection part 120 and a handover operation control part 121. The handover standby operation control part 113 includes a handover standby operation request part 114, a timer 115, a moved history notification part 116, a memory 117 and a handover request part 118.

A communication quality measuring part 112 receives a perch channel from the base station 150-1 of the communication partner via the transmit/receive control part 111, and measures the received power. The handover standby operation control part 114 determines whether the received power of the perch channel from the base station 150-1 falls below the handover standby threshold on the basis of the result of the measurement of the communication quality measuring part 112. When the received power falls below the handover standby threshold, the handover standby operation request part 114 sends a handover standby operation request to the base station control apparatus 130, and activates the timer 115, the moved history notification part 116 and the perch channel received power measuring part 119.

The moved history notification part 116 is activated by the handover standby operation request part 114, and reads a moved history of the mobile station 110 from the memory 117. The moved history is formed, for example, by a history (handover history) of base stations which have become a communication partner after the current communication started, or a history of cells formed by each base station in which the mobile station has resides. The moved history read from the memory 117 is sent to the base station control apparatus 130 via the transmit/receive control part 111.

The perch channel received power measuring part 119 is activated by the handover standby operation request part 114, and, then, receives perch channels of the base stations 150-2–150-4 surrounding the base station 150-1 of the communication partner a plurality of times via the transmit/receive control part 111, and measures the received powers. The measurement result of received powers of the perch channels from the base stations 150-2–150-4 is sent to the base station control apparatus 130 via the transmit/receive control part 111.

The base station control apparatus 130 selects at least a handover destination candidate base station from the base stations 150-2–150-4 according to the moved history sent from the mobile station 110 and the measurement result of the received powers of the perch channels from the base stations 150-2–150-4. In addition, the base station control apparatus 130 assigns priorities to the base stations and sends the selection result of the handover destination candidate base stations and the proprieties to the mobile station 110. The detailed process of the base station control apparatus 130 will be described later.

The handover destination candidate base station detection part 120 detects the selection result of the handover destination candidate base stations and the priorities from the base station control apparatus 130, and sends them to the handover operation control part 121.

The commination quality measurement part 112 continues to measure the received power of the perch channel from the base station 150-1 of the communication partner. After the handover operation control part 121 receives the selection result of the handover destination candidate base station and the priorities from the base station control apparatus 130, the handover operation control part 121 selects a handover destination from the selected handover destination candidate base stations to start the handover operation when the received power of the perch channel from the base station 150-1 of the communication partner falls below the handover threshold by the time when the timer 115 expires.

More concretely, the handover operation control part 121 determines whether the received power of the perch channel from each handover destination candidate base station is larger than the handover threshold.

Next, the handover operation control part 121 tries to perform handover to at least a handover destination candidate base station having the received power which is larger than the handover threshold in the order of priority so as to switch the communication partner. When every received power of the perch channels from the handover destination candidate base stations included in the selection result is below the handover threshold, the handover operation control part 121 does not perform handover, or, performs handover to a handover destination candidate base station in which the received power of the perch channel is the largest for switching the communication partner.

On the other hand, when one of following two cases occurs, the handover operation control part 121 performs handover to a handover destination candidate base station having the highest received power so that the communication partner is switched. One case is that the handover operation control part 121 does not receive the selection result of the handover destination candidate base stations and the priorities from the base station control apparatus 13 by the time when the received power of the perch channel from the base station 150-1 of the communication partner falls below the handover threshold value. Another case is that no base station is selected as the handover destination candidate base station even when the received power of the perch channel from the base station 150-1 of the communication partner falls below the handover threshold by the time of expiration of the timer 115 after the selection result of the handover destination candidate base station and the priorities from the base station control apparatus 130 are received.

In addition, the handover operation control part 121 does not perform handover operation when the received power of the perch channel from the base station 150-1 of the communication partner does not fall below the handover threshold by the time of the expiration of the timer 115.

The handover request part 118 sends a handover request to the base station control apparatus 130 via the transmit/receive control part 111 when the received power of the perch channel from the base station 150-1 of the communication partner further decreases so that the received power falls below the handover threshold by the time of expiration of the timer 115. This handover request includes information by which a base station to which the handover operation control part 121 tries handover is specified, that is, information by which a base station of the handover destination is specified. The base station control apparatus 130 performs predetermined control for handover according to this handover request.

Figure 3:
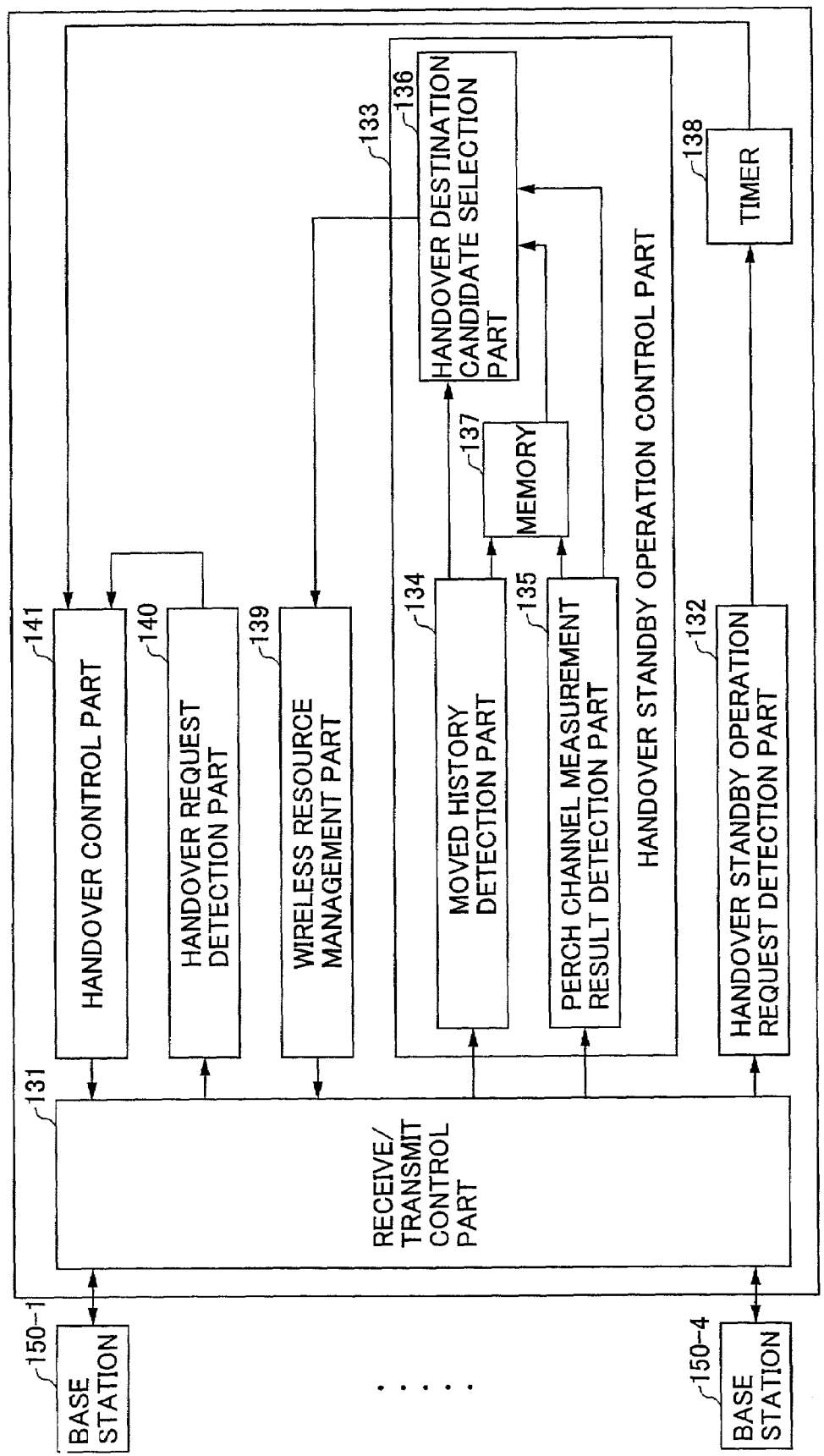
FIG. 3 shows a configuration example of a base station control apparatus.

FIG. 3 shows a configuration example of the base station control apparatus 130. The base station control apparatus 130 includes a receive/transmit control part 131, a handover standby operation request detection part 132, a handover standby operation control part 133, a timer 138, a wireless resource management part 139, a handover request detection part 140 and a handover control part 141. Among these, the handover standby operation control part 133 includes a moved history detection part 134, a perch channel measurement detection part 135, a handover destination candidate selection part 136 and a memory 137.

When the handover standby operation request detection part 132 receives a handover standby operation request from the handover standby operation request part 114 in the mobile station 110, the handover standby operation request detection part 132 activates the handover standby operation control part 133 and the timer 138.

The moved history detection part 134 in the handover standby operation control part 133 detects a moved history (handover history or area residing history) of the mobile station 110 which is sent from the moved history notification part 116 in the mobile station 110. The perch channel measurement result detection part 135 detects the measurement result of the received powers of the perch channels from the base stations 150-2–150-4 sent from the perch channel received power measurement part in the mobile station 110.

The handover destination candidate selection part 136 selects at least a handover destination candidate base station and assigns priorities to the handover destination candidate base stations by comparing mobile station information with a history of mobile station information of past successful handover stored in the memory 137, in which the mobile station information includes moved history of the mobile station 110 detected by the moved history detection part 134 and received powers of perch channels from the base stations 150-2–150-4 detected by the perch channel measurement result detection part 136.

FIG. 4 shows an example of the history of the mobile station information of the past successful handover stored in the memory 137. The history shown in FIG. 4 is a history of mobile station information of past successful handover for every base station controlled by the base station control apparatus 130. In addition, each history data of the mobile station information corresponds to a combination of a base station of handover origination and a base station of handover destination. Each data of the mobile station information history $X_{mn}$ indicates moved history and an average value of received powers of the perch channels when the mobile station handed over from the base station m of handover origination to the base station n of the handover destination.

The handover destination candidate selection part 136 extracts histories indicating the base station 150-1 as a base station of handover origination among the histories of the mobile station information stored in the memory 137. Next, the handover destination candidate selection part 136 correlates between each extracted history data of mobile station information and the mobile station information from the mobile station 110. Then, the handover destination candidate selection part 136 selects, as the handover destination candidate base station, a base station of handover destination corresponding to a history of the mobile station information in which the correlation value with the mobile station information from the mobile station 110 is equal to or more than a predetermined threshold value.

In addition, when the handover destination candidate selection part 136 selects a plurality of handover destination candidate base stations, the handover destination candidate selection part 136 determines the priorities in the decreasing order of correlation value. When there is no mobile station information history in which the correlation value is equal to or more than the predetermined threshold, the handover destination candidate selection part 136 outputs a selection result indicating there is no handover destination candidate base station.

The wireless resource management part 139 keeps wireless resource in the handover destination candidate base station selected by the handover destination candidate selection part 136. Next, the wireless resource management part 136 notifies the mobile station of the handover destination candidate base station in which wireless resource is kept via the transmit/receive control part 131. When it fails to keep wireless resources for every handover destination candidate base station, or, when a selection result indicating that there is no handover destination candidate base station is obtained by the handover destination candidate selection part 136, the wireless resource management part 136 notifies the mobile station 110 of it.

As mentioned above, when the received power of the perch channel from the base station 150-1 falls below the handover threshold, the mobile station 110 sends a handover request to the base station control apparatus 130. Then, the base station control apparatus 130 selects the handover destination according to the notification and starts handover operation.

The handover request detection part 140 receives the handover request from the mobile station 110, and outputs the handover request to the handover control part 141. When the handover control part 141 receives the handover request by the time of expiration of the timer 138, the handover control part 141 recognizes a base station of the handover destination on the basis of information for specifying the base station of the handover destination included in the handover request so that it performs predetermined control for handover. On the other hand, the handover control part 141 ends the operations when the handover request is not received by the time of the expiration of the timer 138.

When the handover request is input to the handover control part 141 by the time of the expiration of the timer 138, the wireless resource management part 138 recognizes the base station of handover destination on the basis of information specifying the base station of the handover destination included in the handover request, and releases wireless resources kept in base stations other than the base station of the handover destination. On the other hand, when the handover request is not input to the handover control part 141 by the time of the expiration of the timer 138, the wireless resource management part 138 releases every wireless resource which is reserved.

As mentioned above, since the wireless resource management part 139 releases the wireless resources when the timer 138 expires, the expiration time interval of the timer 138 is set to be longer than that of the timer 115 in the mobile station 110 such that it does not occur that handover is impossible since the wireless recourse is already released when the mobile station 110 request handover.

When the handover ends, the moved history detection part 134 outputs moving history of the mobile station 110 to the memory 137 and updates history of mobile station information stored in the memory 137. In the same way, the perch channel measurement result detection part 135 outputs measurement results of received power of perch channels from the base stations 150-2–150-4 and updates the history of the mobile station information stored in the memory 137.

If handover to other base station occurs or the communication is interrupted within a predetermined period after handover completed, it can not be said that it is proper handover. Therefore, in such a case, the moved history detection part 134 and the perch channel measurement detection part 135 do not output the moved history of the mobile station 110 and the measurement result of received powers of the perch channels from the base stations 150-2–150-4 such that the mobile station information stored in the memory is prevented from being updated.

FIG. 5 is a flowchart indicating the operation of the mobile communication system at the time of handover. In this flowchart, it is assumed that the received power of the perch channel from the base station 150-1 of the communication partner does not fall below the handover threshold before the mobile station 110 receives a handover destination candidate base station from the base station control apparatus 130.

The handover standby operation request part 114 in the mobile station 110 determines whether the received power Q of the perch channel from the base station 150-1 measured by the communication quality measuring part 112 falls below the handover standby threshold $S_{HOP}$ in step 101. When it falls below the handover standby threshold $S_{HOP}$, the timer 115 is activated in step 102. Next, the handover standby operation request part 114 sends a handover standby operation request to the base station control apparatus 130 in step 103.

When the handover standby operation request detection part 132 in the base station control apparatus 130 receives the handover standby operation request in step 104, the timer 138 is activated in step 105.

After the handover standby operation request part 114 sends a handover standby operation request to the base station control apparatus 130 in step 103, the moved history notification part 116 in the mobile station 110 reads moved history (handover history or area residing history) of the mobile station 110 from the memory 117, and sends the moved history to the base station control apparatus 130 in step 106. The moved history detection part 134 in the base station control apparatus 130 receives the moved history of the mobile station 110 in step 107.

The perch channel received power measuring part 119 in the mobile station 110 receives the perch channels from the base stations 150-2–150-4 surrounding the base station 150-1 of the communication partner, measures the received powers in step 108, and sends the measurement result to the base station control apparatus 130 in step 109.

The perch channel measurement detection part 135 in the base station control apparatus 130 receives the measurement result of the received powers of the perch channels from the mobile stations 150-2–150-4 in step 110. Next, the handover destination candidate selection part 136 compares moved history of the mobile station 110 detected by the moved history detection part 134 and the received powers of the perch channels from the base stations 150-2–150-4 detected by the perch channel measurement detection part 135 (mobile station information) with history of mobile station information of past successful handover so that the handover destination candidate base station is selected in step 111.

The wireless resource management part 139 keeps wireless resources in the handover destination candidate base station selected by the handover destination candidate selection part 136 in step 112, and notifies the mobile station 110 of the handover destination candidate base station in step 113.

The handover destination candidate base station detection part 120 in the mobile station 110 receives selection result of the handover destination candidate base station from the base station control apparatus 130 in step 114. Next, the handover operation control part 121 judges whether the timer 115 has expired in step 115. When the timer 115 has expired, the handover operation is not performed. Instead, operations after the judgment whether the received power Q of the perch channel from the base station 150-1 falls below the handover standby threshold $S_{HOP}$, by the handover standby operation control part 114 (step 101) are repeated.

On the other hand, when the timer has not expired, the handover operation control part 121 judges whether the received power Q of the perch channel from the base station 150-1 of the communication partner falls below the handover threshold $S_{HO}$ in step 116. When the received power Q of the perch channel from the base station 150-1 of the communication partner is not below the handover threshold $S_{HO}$, operations after the judgment (step 115) whether the timer 115 has expired by the handover operation control part 121 are repeated.

On the other hand, when the received power Q of the perch channel from the base station 150-1 of the communication partner falls below the handover threshold $S_{HO}$, handover operation starts in step 117.

The wireless resource management part 139 of the base station control apparatus 130 judges whether handover by the mobile station 110 ends in step 118. When handover by the mobile station 110 has not ended, the wireless resource management part 139 judges whether the timer 138 expires in step 119. When the timer has not expired, the operation after the judgment whether handover by the mobile station has ended (step 118) is repeated. When the timer 138 expires, the wireless resource management part 138 releases all wireless resources which are kept in step 120.

On the other hand, when it is judged that the handover by the mobile station 110 has ended in step 118, the wireless resource management part 138 releases wireless resources kept in base stations other than the base station of the handover destination in step 120.

As mentioned above, in the mobile communication system 100, when the received power of the perch channel from the base station 150-1 of the communication partner falls below the handover standby threshold, the mobile station 110 sends a handover standby operation request to the base station control apparatus 130 and sends moved history of the mobile station itself and received powers of the perch channels from the base stations 150-2–150-4 (mobile station information). Then, the base station control apparatus 130 compares the mobile station information with the history of mobile station information so as to select the handover destination candidate base station and notifies the mobile station 110 of the handover destination candidate base station. The mobile station 110 switches communication partner to the handover destination candidate base station when the received power of the perch channel from the base station 150-1 falls below the handover threshold.

Therefore, it does not occur that handover is performed since the received power from the surrounding base station 150-2–150-4 is larger than a predetermined value even when the received power of the perch channel from the base station 150-1 is large enough. Thus, unnecessary handover can be suppressed so that wireless resources can be used efficiently, and load of the mobile station 110 and the base station control apparatus 130 can be decreased.

In addition, since the wireless resources of the base station of the handover destination can be kept before handover is performed, it can be avoided that the base station rejects handover so that communication is disconnected forcefully. Thus, success ratio of handover can be increased.

In the above mentioned embodiments, the base station forms a cell as the communication area. However, it can be considered that the base station forms a plurality of sectors to which the cell is divided. In this case, an apparatus (transmit/receive apparatus) which has at least a directional antenna in a plurality of directional antennas provided in a base station for forming the sectors corresponds to the communication apparatus. In other words, a base station includes a plurality of transmit/receive apparatuses, and each transmit/receive apparatus forms the sector.

Also in this case, control same as that in the above-mentioned embodiments is performed. That is, when the received power of the perch channel from the transmit/receive apparatus of the communication partner falls below the handover standby threshold, the mobile station sends the handover standby operation request to the base station control apparatus 130 and sends moved history of the mobile station itself and received powers of the perch channels from the surrounding transmit/receive apparatuses (mobile station information). Then, the base station control apparatus compares the mobile station information with the history of mobile station information so as to select the handover destination candidate transmit/receive apparatus and notifies the mobile station of the handover destination candidate transmit/receive apparatus. The mobile station switches communication partner to the handover destination candidate transmit/receive apparatus when the received power of the perch channel from the transmit/receive apparatus of the communication partner falls below the handover threshold. The history of the mobile station information held in the communication control apparatus is held for each combination of a transmit/receive apparatus of handover origination and a transmit/receive apparatus of handover destination.

As mentioned above, according to the present invention, it does not occur that handover is performed since the received power from the surrounding base station is larger than a predetermined value even when the received power of the perch channel from the base station is large enough. Thus, unnecessary handover can be suppressed so that wireless resources can be used efficiently, and load of the mobile station and the base station control apparatus can be decreased.

In addition, since the wireless resources of the base station of the handover destination can be kept before handover is performed, it can be avoided that the base station rejects handover so that communication is disconnected forcefully. Thus, success ratio of handover can be increased.

The present invention is not limited to the specifically disclosed embodiments, and variations and modifications may be made without departing from the scope of the invention.

What is claimed is:

1. A handover control method used in a mobile communication system which includes communication apparatuses having functions of base stations, a mobile station and a communication control apparatus which controls connections between said communication apparatuses and said mobile station, wherein said mobile station switches a communication apparatus of a communication partner to another communication apparatus when a communication quality value between said communication apparatus of said communication partner and said mobile station falls below a first threshold which is better than a limitation value by which communication is available, said handover control method comprising the steps of:

said communication control apparatus:
receiving a handover history from the mobile station, said handover history identifying origination and destination base stations of previous successful handovers of the mobile station;
selecting at least a handover destination candidate communication apparatus from among communication apparatuses surrounding said communication apparatus of said communication partner based at least on the received handover history;
reserving wireless resources of said at least a handover destination candidate communication apparatus which is selected;
notifying said mobile station of a handover destination candidate communication apparatus for which wireless resources are reserved in said at least a handover destination candidate communication apparatus; and
said mobile station switching said communication apparatus of said communication partner to said handover destination candidate communication apparatus which is notified by said communication control apparatus when said communication quality value falls below said first threshold.

2. The handover control method as claimed in claim 1, further comprising the steps of:
said mobile station judging whether said communication quality value falls below said second threshold, and
sending a request for selecting said at least a handover destination candidate communication apparatus to said communication control apparatus when said communication quality value falls below said second threshold.

3. The handover control method as claimed in claim 1, further comprising the steps of:
  when said communication control apparatus selects a plurality of handover destination candidate communication apparatuses, said communication control apparatus determining priorities of said plurality of handover destination candidate communication apparatuses;
  said communication control apparatus notifying said mobile station of handover destination candidate communication apparatuses in said plurality of handover destination candidate communication apparatuses for which wireless resources are reserved and corresponding priorities;
  said mobile station switching said communication apparatus of said communication partner to one of said notified handover destination candidate communication apparatuses according to said priorities.

4. The handover control method as claimed in claim 1, comprising the steps of:
  said mobile station sending mobile station information to said communication control apparatus, said mobile station information including a history of movement of said mobile station and received powers of perch channels from communication apparatuses surrounding said communication apparatus of said communication partner;
  said communication control apparatus having a history of mobile station information, said history of mobile station information including a history of movement of said mobile station and received powers of perch channels from communication apparatuses surrounding said communication apparatus of said communication partner for past successful handover; and
  said communication control apparatus selecting said at least a handover destination candidate communication apparatus according to said mobile station information sent from said mobile station and said history of mobile station information for past successful handover.

5. The handover control method as claimed in claim 4, further comprising the steps of:
  when said communication control apparatus selects a plurality of handover destination candidate communication apparatuses, said communication control apparatus determining priorities of said plurality of handover destination candidate communication apparatuses according to said mobile station information sent from said mobile station and said history of mobile station information for past successful handover.

6. The handover control method as claimed in claim 4, further comprising the steps of:
  said communication control apparatus holding said history of mobile station information for all communication apparatuses controlled by said communication control apparatus.

7. The handover control method as claimed in claim 4, further comprising the steps of:
  said communication control apparatus holding said history of mobile station information by each combination of a communication apparatus of handover origination and a communication apparatus of handover destination.

8. The handover control method as claimed in claim 7, further comprising the steps of:
  said communication control apparatus selecting a communication apparatus of handover destination corresponding to history data in said history of mobile station information in which a correlation value between said history data and said mobile station information sent from said mobile station is equal to or larger than a predetermined value.

9. The handover control method as claimed in claim 8, further comprising the steps of:
  when said communication control apparatus selects a plurality of handover destination candidate communication apparatuses, said communication control apparatus determining priorities of said plurality of handover destination candidate communication apparatuses according to said correlation value.

10. A communication control apparatus in a mobile communication system which includes communication apparatuses having functions of base stations, a mobile station and said communication control apparatus which controls connections between said communication apparatuses and said mobile station, said communication control apparatus comprising:
  a switching part for allowing said mobile station to switch a communication apparatus of a communication partner to another communication apparatus when a communication quality value between, said communication apparatus of said communication partner and said mobile station falls below a first threshold which is better than a limitation value by which communication is available,
  the switching part having:
    a part for receiving a handover history from the mobile station, said handover history identifying origination and destination base stations of previous successful handovers of the mobile station
    a part for selecting at least a handover destination candidate communication apparatus from among communication apparatuses surrounding said communication apparatus of said communication partner based at least on the received handover history;
    a part for reserving wireless resources of said at least a handover destination candidate communication apparatus which is selected; and
    a part for notifying said mobile station of a handover destination candidate communication apparatus for which wireless resources are reserved in said at least a handover destination candidate communication apparatus.

* * * * *